(12) United States Patent
Karve et al.

(10) Patent No.: US 8,185,836 B2
(45) Date of Patent: May 22, 2012

(54) DISPLAY, VISUALIZATION, AND PROCESSING TOOL FOR CHANNEL DISTORTION AND CELL FRICTION MITIGATION

(75) Inventors: Atul Arun Karve, Wilmington, NC (US); James Brian Smith, Castle Hayne, NC (US); John R. Burr, Wilmington, NC (US); Angelo Peter Chopelas, Wilmington, NC (US); Gerald A. Potts, Wilmington, NC (US); Mark A. Dubecky, Wilmington, NC (US)

(73) Assignee: Global Nuclear Fuel - Americas LLC, Wilmington, NC (US)

(*) Notice: Subject to any disclaimer, the term of this patent is extended or adjusted under 35 U.S.C. 154(b) by 1515 days.

(21) Appl. No.: 11/354,976

(22) Filed: Feb. 16, 2006

(65) Prior Publication Data

US 2007/0192069 A1 Aug. 16, 2007

(51) Int. Cl.
 *G06F 3/048* (2006.01)
 *G06F 3/00* (2006.01)
(52) U.S. Cl. ........ 715/764; 715/771; 715/781; 715/848; 715/866; 376/215; 376/245; 703/6
(58) Field of Classification Search .................. 715/700, 715/764, 771, 781, 848, 866; 703/6; 376/216, 376/215, 245
See application file for complete search history.

(56) References Cited

U.S. PATENT DOCUMENTS

| | | | |
|---|---|---|---|
| 4,749,543 A | 6/1988 | Crowther et al. | |
| 4,988,476 A * | 1/1991 | Sadaoka et al. | 376/245 |
| 5,787,140 A | 7/1998 | Dunlap et al. | |
| 5,790,616 A * | 8/1998 | Jackson | 376/245 |
| 6,310,929 B1 * | 10/2001 | Hirukawa | 376/245 |
| 6,404,437 B1 * | 6/2002 | Russell et al. | 345/473 |
| 6,611,572 B2 | 8/2003 | Bolger et al. | |
| 6,674,825 B2 | 1/2004 | Bolger et al. | |
| 6,748,348 B1 * | 6/2004 | Russell, II | 703/6 |
| 6,862,329 B1 * | 3/2005 | Kropaczek et al. | 376/267 |
| 7,200,541 B2 * | 4/2007 | Kropaczek et al. | 703/13 |
| 7,222,061 B2 * | 5/2007 | Russell et al. | 703/18 |
| 7,231,333 B2 * | 6/2007 | Russell et al. | 703/6 |
| 7,266,481 B2 * | 9/2007 | Kropaczek et al. | 703/6 |
| 7,280,946 B2 * | 10/2007 | Russell et al. | 703/6 |
| 7,337,099 B2 * | 2/2008 | Kropaczek et al. | 703/6 |
| 7,424,412 B2 * | 9/2008 | Kropaczek et al. | 703/6 |
| 7,461,038 B2 * | 12/2008 | Kropaczek et al. | 706/19 |
| 7,555,092 B2 * | 6/2009 | Russell et al. | 376/215 |
| 7,574,337 B2 * | 8/2009 | Kropaczek et al. | 703/6 |
| 7,636,652 B2 * | 12/2009 | Kropaczek et al. | 703/6 |
| 7,672,815 B2 * | 3/2010 | Asgari et al. | 703/2 |
| 2003/0086520 A1 * | 5/2003 | Russell et al. | 376/259 |
| 2004/0076255 A1 | 4/2004 | Masumi | |
| 2004/0122629 A1 * | 6/2004 | Russell et al. | 703/2 |
| 2004/0122632 A1 * | 6/2004 | Kropaczek et al. | 703/2 |

(Continued)

*Primary Examiner* — Steven B Theriault
(74) *Attorney, Agent, or Firm* — Nixon & Vanderhye P.C.

(57) ABSTRACT

An apparatus generating a graphical image of a core of a boiling water reactor (BWR) using at least one data set of channel deformation data including: a computer system including a display device for presenting the graphical image and a processor generating the graphical image using the at least one data set; the graphical image of the core includes symbolic representations of control blades arranged in the core, indicia identify each control blade, and indicia regarding deformation of channels adjacent each control blade, and a viewer software tool executed by the processor which accesses the at least one data set and determines a location in the core of the control blades and channels, and correlates the deformation data with the channels for display on the graphical image.

20 Claims, 10 Drawing Sheets

U.S. PATENT DOCUMENTS

| | | | |
|---|---|---|---|
| 2004/0220787 A1* | 11/2004 | Russell et al. | 703/6 |
| 2005/0015227 A1* | 1/2005 | Kropaczek et al. | 703/6 |
| 2005/0222833 A1* | 10/2005 | Kropaczek et al. | 703/18 |
| 2006/0149512 A1* | 7/2006 | Kropaczek et al. | 703/2 |
| 2006/0149514 A1* | 7/2006 | Kropaczek et al. | 703/6 |
| 2006/0149608 A1* | 7/2006 | Asgari et al. | 705/8 |
| 2006/0291608 A1* | 12/2006 | Davis et al. | 376/245 |
| 2009/0144039 A1* | 6/2009 | Thorsteinsson | 703/6 |

* cited by examiner

Fig. 12

```
Table.txt - Notepad                                              _ □ ×
File  [Edit]  Format   Help IP11B01P 1.0.0  \\ncwlmt28nege\perm\IP11B01PX
Output Created on 3/17/2005 2:23:55 PM
\\gnfa\karve\p11\hh1\cy10\hh1c10t30.ced Qualifier - 00000     Exposure 205.27 MWD/ST
-----------------------------------------------

Cell Friction            Cell Friction            Cell Friction
    Metric - Level I         Metric - Level II        Metric - Level III RUFBC(I,J,1)>1           RUFBC(I,J,2)>1           RUFBC(I,J,3)>1
    ------------------       ------------------       ------------------
    37 Total                 4 Total                  0 Total PANACEA SITE   VALUE     PANACEA SITE   VALUE     PANACEA SITE   VALUE
    ------------------       ------------------       ------------------
    29,19   58,23   2.33     29,19   58,23   1.14
    01,19   02,23   2.32     01,19   02,23   1.14
    29,11   58,39   2.31     29,11   58,39   1.13
    01,11   02,39   2.29     01,11   02,39   1.13
    11,29   22,03   1.52
    17,01   34,59   1.48
    11,01   22,59   1.47 lines deleted...|

Qualifier - HH110D70  Exposure 16353.73 MWD/ST
-----------------------------------------------

Cell Friction            Cell Friction            Cell Friction
    Metric - Level I         Metric - Level II        Metric - Level III RUFBC(I,J,1)>1           RUFBC(I,J,2)>1           RUFBC(I,J,3)>1
    ------------------       ------------------       ------------------
    74 Total                 27 Total                 16 Total PANACEA SITE   VALUE     PANACEA SITE   VALUE     PANACEA SITE   VALUE
    ------------------       ------------------       ------------------
    09,03   18,55   3.26     09,03   18,55   1.60     09,03   18,55   1.24
    03,09   06,43   3.26     03,09   06,43   1.60     03,09   06,43   1.24
    21,03   42,55   3.23     21,03   42,55   1.59     21,03   42,55   1.22
    03,21   06,19   3.18     03,21   06,19   1.56     03,21   06,19   1.20
    09,27   18,07   3.16     09,27   18,07   1.55     09,27   18,07   1.20
```

*Fig. 13*

DISPLAY, VISUALIZATION, AND PROCESSING TOOL FOR CHANNEL DISTORTION AND CELL FRICTION MITIGATION

BACKGROUND OF THE INVENTION

The present invention relates to fuel channels used to encase fuel bundles in a boiling water nuclear reactor (BWR). The invention specifically relates to computer systems that depict and analyze the fuel channels.

A Boiling Water Nuclear Reactor (BWR) generates power from a controlled nuclear fission reaction. As shown in FIG. 14, a simplified BWR includes a reactor chamber 101 that contains a nuclear fuel core and water. Generated steam is transferred through pipe 102 to turbine 103, where electric power is generated, and the water returns to the core through pipe 104. A control computer 106 may control the operation of the BWR and particularly its core.

In the BWR core, fuel rod bundles are encased in thin rectangular fuel channels. A fuel channel may be embodied as a hollow box within which are arranged the fuel rod bundles. Fuel channels can deform. They may deform due to various nuclear and mechanical responses in the core of an operating BWR driven primarily by plant operation strategy. The nuclear and mechanical responses are complex and spread out over time. For example, the operation of a channel (the "cause") may result in channel deformation (the "effect") observed later in the residence time of the channel in the core.

A deformed channel can adversely affect the performance of the core. For example, a deformed fuel channel can inhibit the movement of control blades through the core. On the other hand, a deformed fuel channel at another location may not interfere with control blades or cause difficulties.

Channel deformations can lead to channel-control blade interference (e.g. cell friction), which may hinder the control blade operation. Control blades in a BWR are actively used for safe and efficient operation. Any hindrance that affects plant safety or licensing bases may require undesirable mitigating actions. Therefore, cell friction needs to be adequately managed as part of reactor cycle design, optimization, licensing, and monitoring.

An added complexity is that after a specified period of operation (for example, 18 to 24 months), the core is refueled and transitions to a new operating cycle. As part of refueling, channels are shuffled in the core. The shuffling typically results in substantial changes in the operation and interactions of the channel. For example, a deformed channel that causes no difficulty in one location may be inadvertently moved to another location in the core where the channel deformation interferes with a control blade.

Channel distortion and cell friction phenomenon are typically addressed within the context of an operating nuclear reactor cycle design, optimization, licensing, and monitoring. Channel deformation affects many operational and safety parameters. Deformations are typically addressed as part of reactor cycle design, optimization, licensing and monitoring. Information regarding deformed channels is collected and available. However, conventional methods used for design, optimization, licensing, and monitoring of a nuclear reactor do not provide a graphical user interface (GUI) format to address channel distortion and cell friction. Accordingly, there is a long felt need for a tool to assist BWR users and designers in addressing channel deformation issues.

BRIEF DESCRIPTION OF THE INVENTION

An innovative tool has been developed that assists BWR operators and designers to analyze channel distortion and cell friction issues during various stages of nuclear reactor cycle design, optimization, licensing, and monitoring. The tool provides a computer screen display (or other printed or electronic image) to illustrate channel distortion and cell friction, and their effects. The tool assists users in visualization of channel distortion and cell friction, and decide whether, and how to mitigate for, the effects of channel distortion and cell friction.

A novel aspect of the tool is that it presents a substantial amount of information regarding channel deformations in a convenient graphical user interface that assists users to easily identify problems due to deformations. The tool distributes the available information regarding deformations in a general and flexible manner into various components based on different interactions, which assists the user to uniquely identify and take mitigating action for a specific cell friction in the core. The tool is applicable to methods used for design, optimization, licensing and monitoring of BWRS. The tool may be embodied in a computer software module that is part of computer programs used for the design, optimization, licensing, and monitoring of a BWR.

In one embodiment, the invention is a software visualization tool apparatus to display, visualize, and process data on channel distortion and cell friction phenomenon. The tool enables users to display and process data on various severity levels of cell friction for each cell in a BWR core; to generate a monitoring cell table for cell friction mitigation during operation of a nuclear reactor, and to monitor channel deformation and cell friction phenomenon.

An apparatus is disclosed for generating a graphical image of a core of a boiling water reactor (BWR) using at least one data set of channel deformation data, said apparatus comprising: a computer system including a display device for presenting the graphical image and a processor generating the graphical image using the at least one data set; said graphical image of the core includes symbolic representations of control blades arranged in the core, indicia identify each control blade, and indicia regarding deformation of channels adjacent each control blade, and a viewer software tool executed by the processor which accesses the at least one data set and determines a location in the core of the control blades and channels, and correlates the deformation data with the channels for display on the graphical image. The viewer software tool may identify surfaces of each channel adjacent to one of the control blades, and includes data regarding deformation of those identified surfaces in the graphical image. Further, the indicia regarding deformation of each channel surface may be presented adjacent a corresponding wing of the control blade and be limited to indicia of channel surfaces adjacent a wing included in the symbolic representation of one of the control blades.

The disclosed apparatus may also generate a graphical image of a core of a boiling water reactor (BWR) using at least one data set of channel deformation data, said apparatus comprising: a computer system including a display device for presenting the graphical image and a processor generating the graphical image using the at least one data set; said graphical image of the core includes symbolic representations of control cells arranged in the core wherein the representations are arranged in the core image corresponding to the locations of control cells in the core of the BWR, and a viewer software tool executed by the processor which accesses the at least one data set and determines a location in the core for each of the symbolic representations of control cells and determines which control cell representations to include in the graphical image based on channel deformation data for each cell. The determination of which control cell representations to include may be based on whether a deformation metric for a control cell exceeds a predetermined threshold level for the metric, and the threshold level may be a selectable level. Further, the viewer software tool may include a selection of a plurality of data sets and a selected data set is used by the viewer software tool to determine which control cell representations to include in the image.

A method is disclosed for generating a graphical image of a core of a boiling water reactor (BWR) using at least one data set of channel deformation data and a processor to access the data and generate the graphical image, said method comprising: accessing at least one data set of a plurality of data sets, wherein the accessed data set includes data regarding channel deformation in a plurality of channels in the core and regarding a location of the channel with respect to control blades in the core; processing the accessed data to identify the surfaces of the channels that are adjacent to one of the control blades and to collect data regarding channel deformation for the identified channel surfaces, and generating the graphical image of the core, said graphical includes symbolic representations of control blades arranged in the core, indicia identify each control blade, and indicia regarding deformation of channels adjacent each control blade. The processing and generating steps may be performed by a viewer software tool executed by the processor which accesses the at least one data set and determines a location in the core of the control blades and channels, and correlates the deformation data with the channels for display on the graphical image.

BRIEF DESCRIPTION OF THE DRAWINGS

FIG. 12 is a computer display screen image of a BWR core with indicia identifying control cells.

FIG. 13 is a monitor cell table that tabulates problem cells with different severity levels.

DETAILED DESCRIPTION OF THE INVENTION

Figure 1:
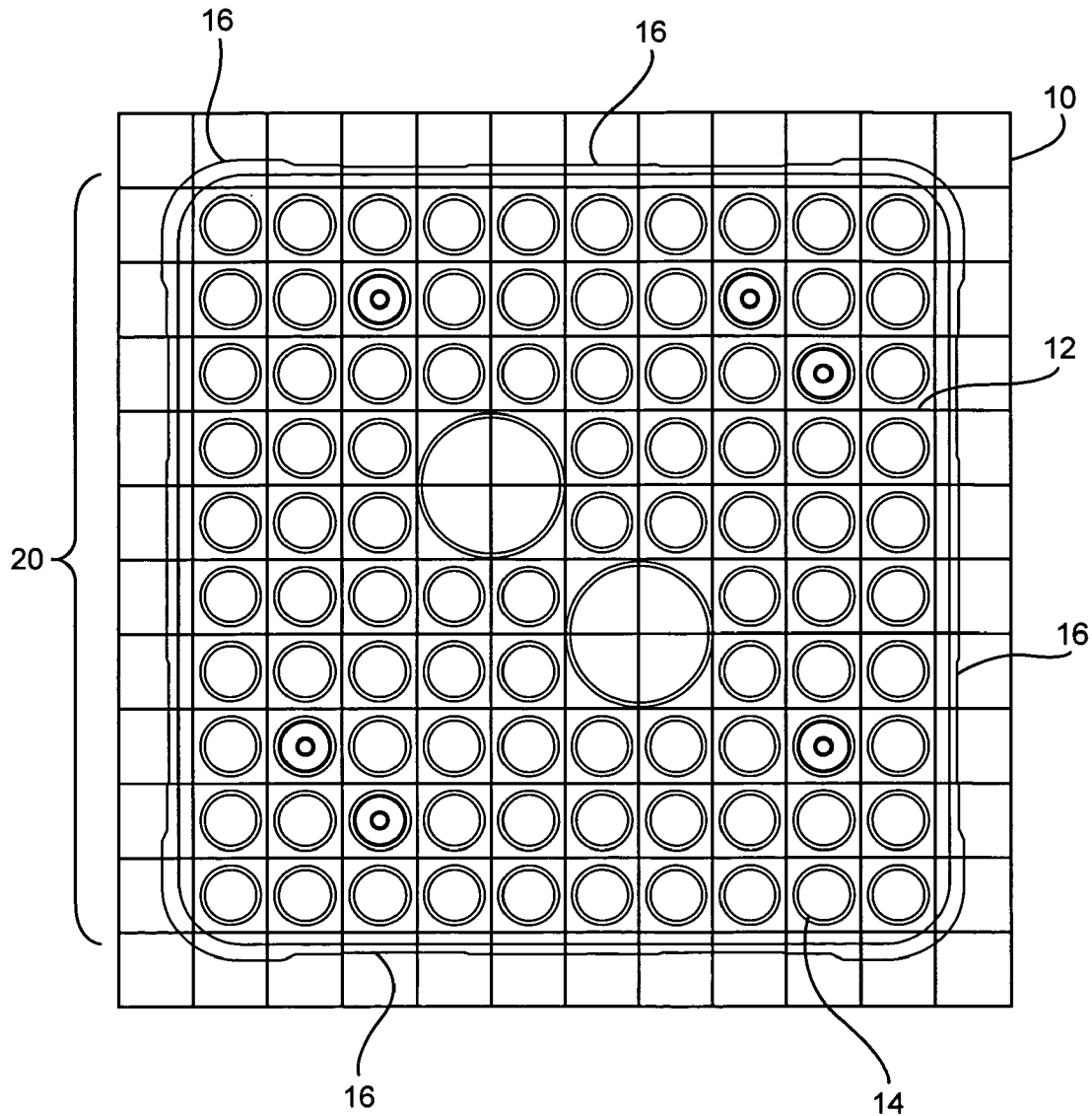
FIG. 1 is a top down two-dimensional schematic diagram of a conventional fuel cell plotted on a grid.

FIG. 1 is a top down two-dimensional schematic diagram of a conventional fuel bundle 12 shown on a grid 10 for purposes of illustration. The diagram may be a computer-generated display of a fuel cell in a BWR reactor. The diagram is a two-dimensional (2D) grid layout 10 of the fuel bundle 12 having potential fuel rod locations arranged in a ten by ten (10×10) array. The bundle 12 is housed in a thin-walled fuel channel 16. Some of the 10×10 rod grid locations are combined to form a larger circle to illustrate different components in a fuel bundle. Such details however are not relevant for this discussion, as FIG. 1 is merely provided to illustrate the fuel channel surrounding the fuel bundle. A fuel assembly 20 is generally defined as the fuel channel 16 and the fuel bundle 12 encased by the channel.

The fuel channel 16 is an encasement wall that extends around the perimeter of the fuel bundle, and is open at the bottom and at the top. A fuel channel is typically square or rectangular in cross-section and extends a vertical length of, for example, about 165 inches (4.19 meters) along the entire fuel rod assembly. The wall thickness of the channel is thin, such as for example only about 0.1 inches (2.54 mm). The walls at the corners of the channel may be thicker than at the sidewalls of the channel. The thin walls of the channel are susceptible to bending, bowing and other deformations.

Figure 2:
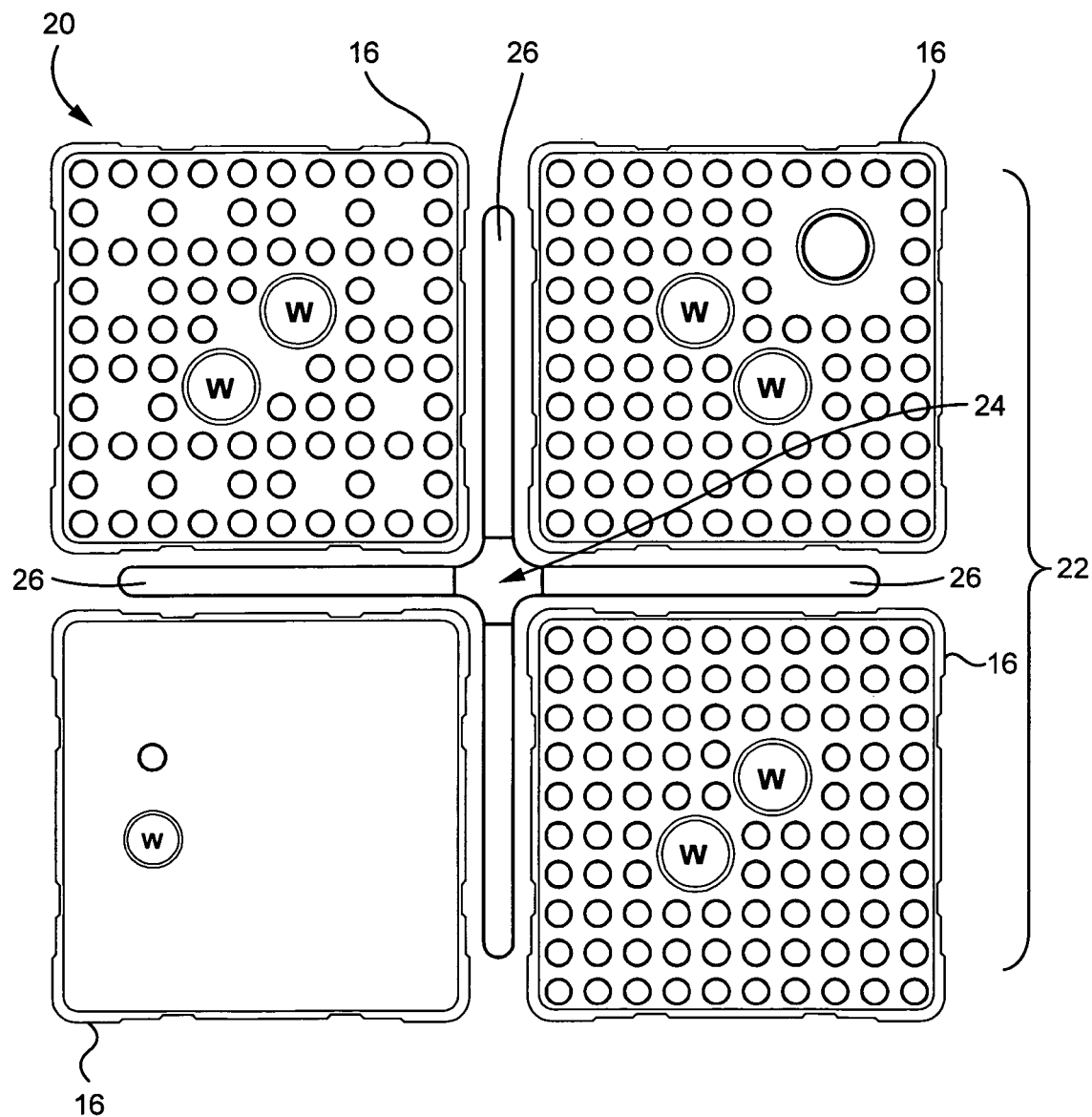
FIG. 2 is a top down two-dimensional schematic diagram of a conventional control cell including four fuel cells and a moveable center control blade between the cells.

FIG. 2 is a top down two-dimensional view (which may be a computer generated image) of a conventional control cell 22 including four fuel assemblies 20 and a center control blade 24 insertable between the fuel assemblies. Typically four adjacent fuel assemblies 20 are positioned such that they are controlled by one control blade 18. The control blade moves vertically between the four fuel assemblies. The control blade 24 has cruciform cross-section and a length sufficient to extend substantially the entire length of the fuel control cell 22. The control blade is typically moved vertically between the fuel assemblies to regulate nuclear fission power production within the cells. Generally, each fuel assembly 20 is adjacent a control blade, and each control cell 22 has one control blade.

A control blade 24 has four blade wings 26. Each wing is positioned in the gap between the channels 16 of adjacent fuel assemblies 20. The wings of the control blade move up and down between the channels. To ensure proper vertical movement of the control blade, the gap between channels should be relatively uniform or at least remain sufficiently wide to not impair control blade motion. The gap can be problematically reduced if the channels bow, bulge or otherwise deform. An undesired narrowing of the gap can result in inhibited movement of the control blade.

Figure 3:
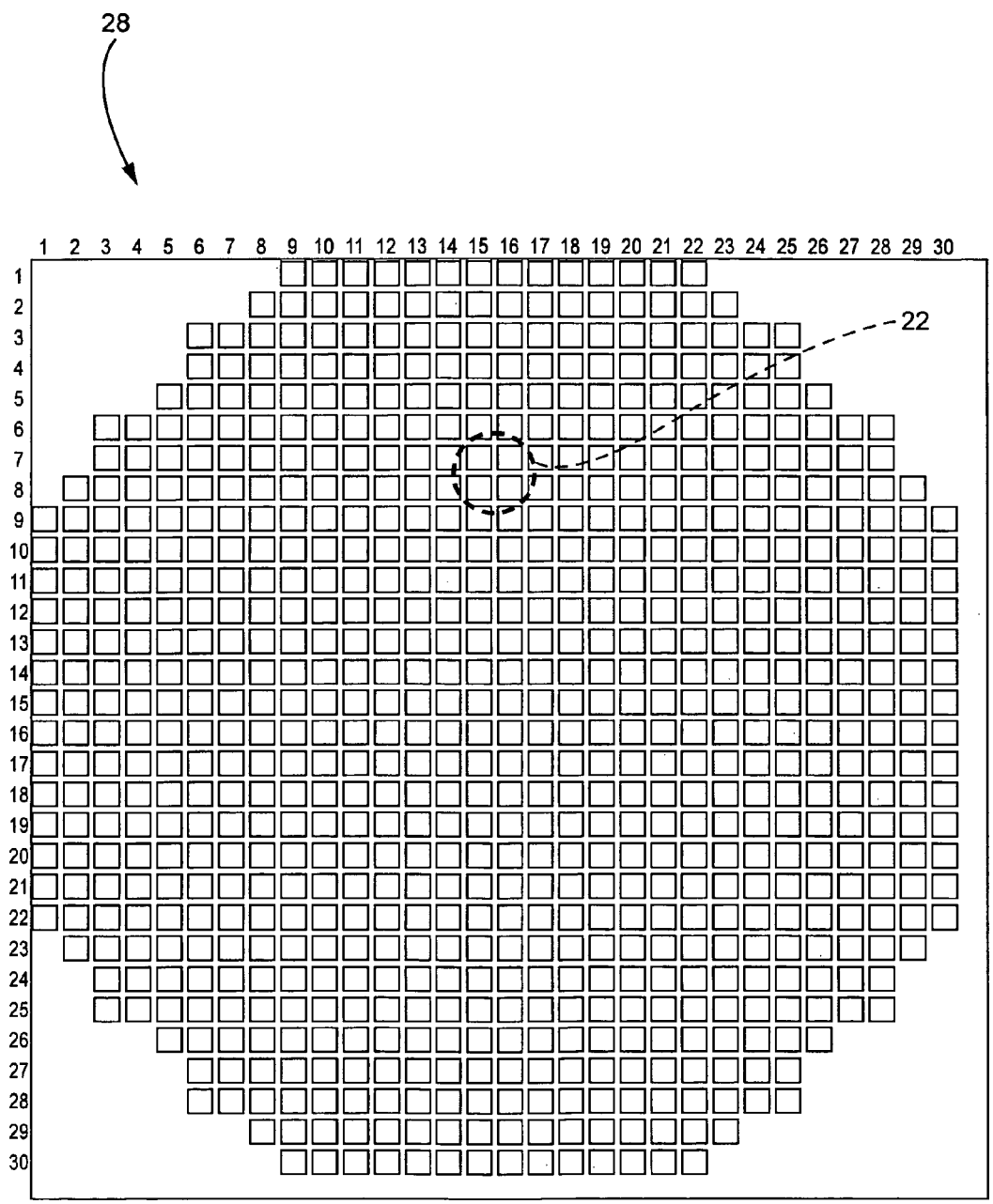
FIG. 3 is a top down two-dimensional schematic diagram of a BWR core comprising hundreds of control cells, each with four fuel cells and a control blade.

FIG. 3 is a top down two-dimensional view (which may be a computer generated image) of a BWR core 28 comprising an assembly of hundreds of control cells 22. Each cell includes a control blade positioned between the channels of the fuel assemblies in the cell. A continuing concern is the deformation of channels due to various nuclear and mechanical interactions within an operating BWR core. Monitoring the hundreds of channels in the core is a complex and difficult task. The available data on channel deformations is numerous. Operators have difficulty in integrating and evaluating the large amount of deformation data when determining how to design or adjust the core to accommodate channel deformation. Channel deformation affects many operational and safety parameters and should be adequately addressed as part of reactor cycle design, optimization, licensing, and monitoring. Channel deformation can lead to channel-control blade interference (cell friction), which may obstruct the operation of control blade.

Figure 4:
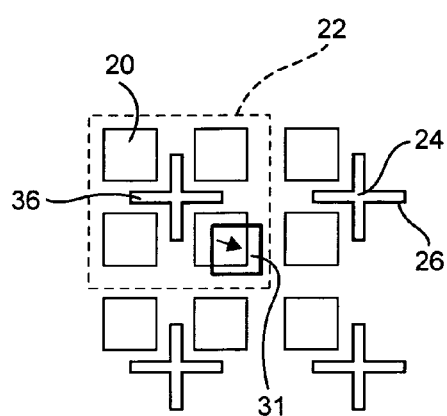
FIGS. 4 and 5 are top and side views, respectively, showing schematically a control cell that has channel distortion due to bowing of a fuel channel.
Figure 5:
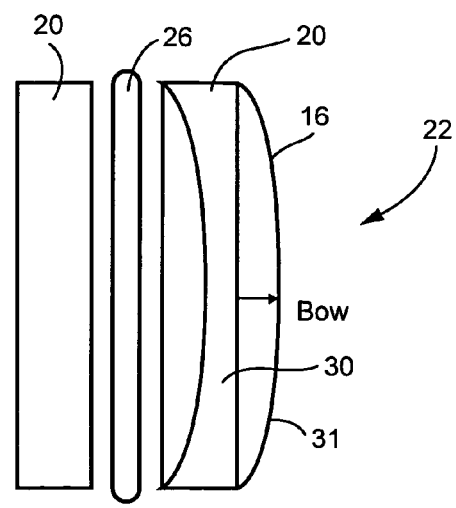

FIGS. 4 and 5 are top and side views, respectively, of a schematic of a control cell 22 that illustrates channel distortion due to bowing 30 of a channel 16 of a center fuel assembly 20. The 2D top view of FIG. 4 is at an axial elevation in the core. FIG. 4 shows one complete cell and portions of three adjacent cells. The center channel 30 shows an offset due to a bow in its fuel assembly, which is a deformation of the channel. The control cells have the channels spaced out in FIGS. 4 to 7, but the illustrated spacing is only schematic and not precisely indicative of the true narrow dimensions of the gap between channels in an operating BWR. In FIG. 5, the offset line 31 shows the bowing of the channel of the fuel assembly. In bow deformation, the channel deforms in a particular direction that may be towards a blade wing or away from the blade wing (as shown in FIG. 4). The bowed channel 30 axially has the shape of a "bow" 31. The bowed channel potentially can flex 31 into the gap between adjacent channels and inhibit movement of the blade wings 26.

Figure 6:
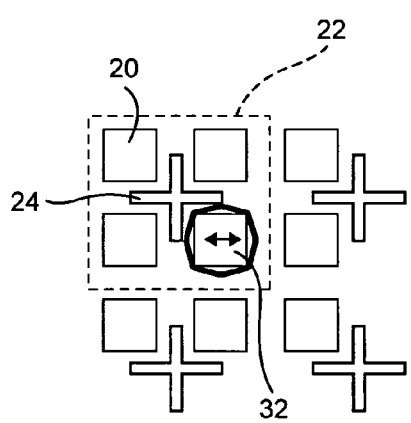
FIGS. 6 and 7 are top and side views, respectively, showing schematically a control cell having channel distortion due to bulging of a fuel channel.
Figure 7:
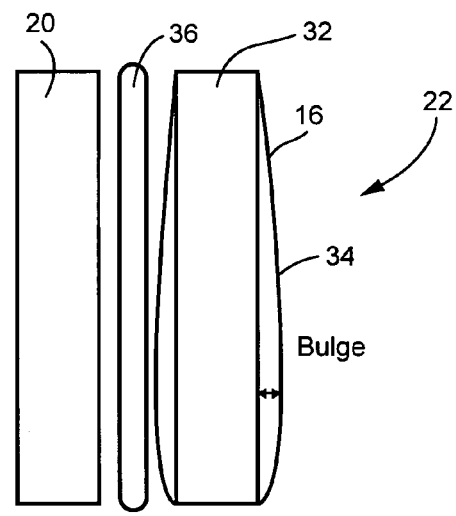

FIGS. 6 and 7 are top and side views, respectively, of a schematically shown control cell 22 that illustrates channel distortion due to bulging 34 of the channel of a center fuel assembly 32. The bulge 34 is on all four faces of the channel and expands symmetrically outward in all lateral directions. In contrast, the bowed condition deflects the channel walls asymmetrically in a particular side-ways direction (as is evident from the offset 31 of the bowed channel 30 in FIG. 4).

Blade interference is illustrated in FIGS. 6 and 7 for a control cell 22 having a bowed fuel assembly 32 that abuts control blade 36. The bulging channel walls 34 abut against the wings 26 of a control blade 36. In contrast, the bowing channel 30 shown in FIGS. 4 and 5 do not abut a control blade and does not interfere with the movement of control blades. The four control blades in the vicinity of the bowing channel 30 (shown in FIG. 4) can move freely in and out of the core (the plane of the page) because the bowing 31 channel does not encroach on the gaps between channels in which the blades move. On the other hand, the control cell 22 shown in FIG. 7 shows a center fuel assembly 32 having a channel with substantial deformation. The offset lines 34 indicate the deformation of the channel and they show two sides of the channel abutting against the control blade 36. This interference between the channel and control blade may result in blade friction force and inhibit the free movement of the blade within the control cell. This condition is referred to as "cell friction". Similarly, the bow deflection shown in FIGS. 4 and 5 could have alternately been directed toward the control blade and likewise produced "cell friction".

The control blades 26, 36 in each control cell 22 of a BWR are actively used to safely operate the nuclear reactor. A hindrance to the operation of the control blades, e.g., an obstruction to free vertical movement, is of concern. To ensure free movement of the control blades, friction between the cell and blades should be adequately managed as part of reactor cycle design, optimization, licensing and monitoring.

Information regarding the deformation in the channels of fuel assemblies may be determined using known means, such as is described in commonly-owned pending U.S. patent application Ser. No. 11/340,469 (GE Invention Letter No. 155544-1) filed Jan. 27, 2006 and which is incorporated by reference. For purposes of this disclosure, it is assumed that data regarding deformation of each of the channels in a core has been collected in a known manner and the data is available for presentation.

The amount of data regarding deformed fuel assemblies is massive given the hundreds of fuel assemblies in a typical BWR core. In addition, not all deformed channels in the fuel assemblies hinder control blade movement. Accordingly, there is a need to apply the data on channel deformation in a manner that readily and clearly identifies potential problems with the movement of control blades. In the embodiment disclosed herein, data regarding channel deformation of the fuel assemblies is presented graphically in a particularly user friendly format.

The focus of this disclosure is a system and method for displaying data regarding deformation in the channels of the fuel assemblies of a BWR core in the context of the control cells for the fuel assemblies and the associated control blades. The displayed data is presented to readily and clearly identify control blades that are most at risk of being inhibited by deformation in the channels of adjacent fuel assemblies. The system and method disclosed herein may be a computer generated display that serves as a channel distortion visualization tool.

A person of ordinary skill in the art of graphical user interfaces and having knowledge of BWR control systems, including the data collected on channel deformations, should understand this description of the channel distortion visualization tool. The disclosure of functions performed by the tool and of exemplary screen displays contained herein is sufficient for a person of ordinary skill in the art to understand the functionality and presentation features of the tool and, thus, make and use the tool.

Figure 8:
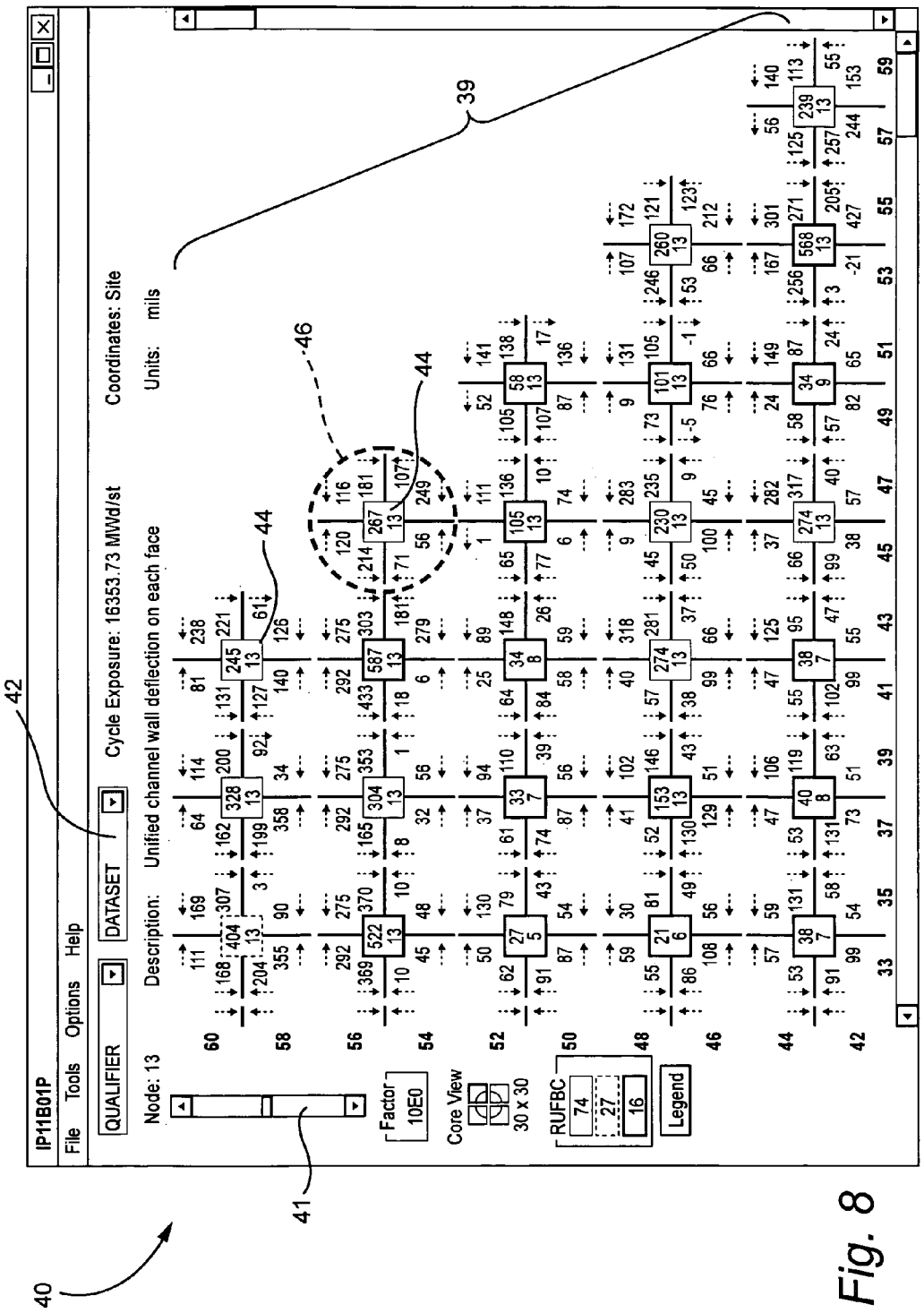
FIG. 8 is an exemplary computer display screen image of a core and showing effects of channel deformation on the control blades in the core.

FIG. 8 is an exemplary screen display of a graphical viewer 40 of a portion of a core 39 and that shows channel deformation and channel control blade interference. The viewer is generated by the computer using a dataset of channel deformation information. The dataset 42 may be selected by an operator using the viewer by a pull-down menu of available sets of data regarding channel deformations. The data sets may be collected at various operational periods in a conventional manner. The selected data set is used to generate the image shown in the graphical viewer 40. A slide bar 41 allows the users to scroll through the axial elevations in the core. The "Core View" selection below 41 identifies the quadrant of the core to be selected for viewing. Optionally, the scroll bars on the bottom and right allow the user to navigate the view.

The data sets may be generated from various conventional software models of deformation. The data sets may include data generated by models that estimate channel deformation based on channel surface creep, channel surface fast fluence, shadow corrosion, and combinations of one or more of these deformation factors. Each data file of channel deformation information includes sufficient identification information to identify each fuel channel, such that the surfaces of each fuel channel can be correlated with respect to a control blade. In particular, a determination can be made by the software supporting the view tool as to whether each face of the fuel channels is adjacent a control blade and, if so, the orientation of the surface with respect to an adjacent control blade. Further, the software tool determines the relative position of the faces of the channel with respect to a control blade adjacent the channel.

Examples of data sets that may be used to generate the data presented on the viewer include data for each channel and channel face regarding: the creep component of the channel faces; channel surface fast fluence above one (1) MeV; channel deformation due to fast fluence; channel deformation due to shadow corrosion; channel deformation due to total bulge (creep and elastic); total channel deformation, and maximum cell friction metric in each control-cell. One or more of these data sets may be used to populate the information presented on the viewer, including the cell friction metric (CFM) number and maximum CFM shown in the box 50 for each cell 44 shown in the view; the color of the box 50 to show the severity of channel deformation for the cell, the value of the deformation and the arrow showing whether the deformation is towards or away from the wing of the control blade.

The viewer 40 schematically shows a top-down view of a core and, in particular, shows schematically control cells 44 as numbered squares at the center of a cross, which is representative of the wings of the control blade 46 in the cell. The viewer also presents information 48 regarding the channels adjacent each of the wings of the control blades. For each cell, the viewer displays a control blade 46. Similarly, the surfaces (e.g., four sidewall faces) of the channels in the cell may be numbered such that each channel surface in a cell can be designated by its channel and surface.

Figure 9:
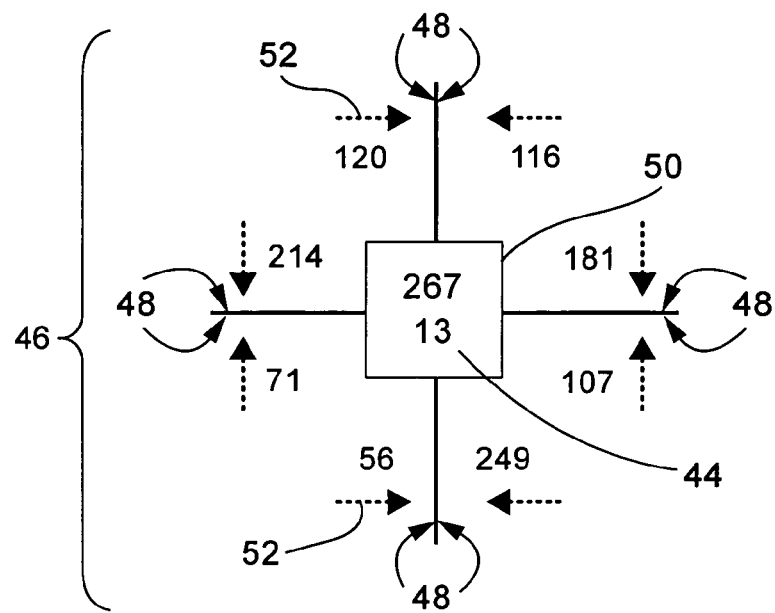
FIG. 9 is a zoomed-in view of the image shown in FIG. 8 and shows a control cell having a control blade, channel surfaces adjacent the blade and indicators of channel deformation.
Figure 14:
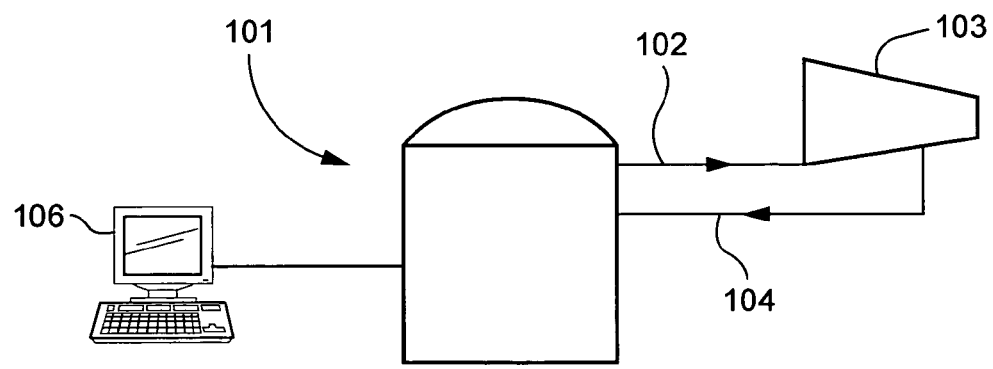
FIG. 14 is a schematic diagram of a conventional boiling water reactor (BWR).
Figure 10:
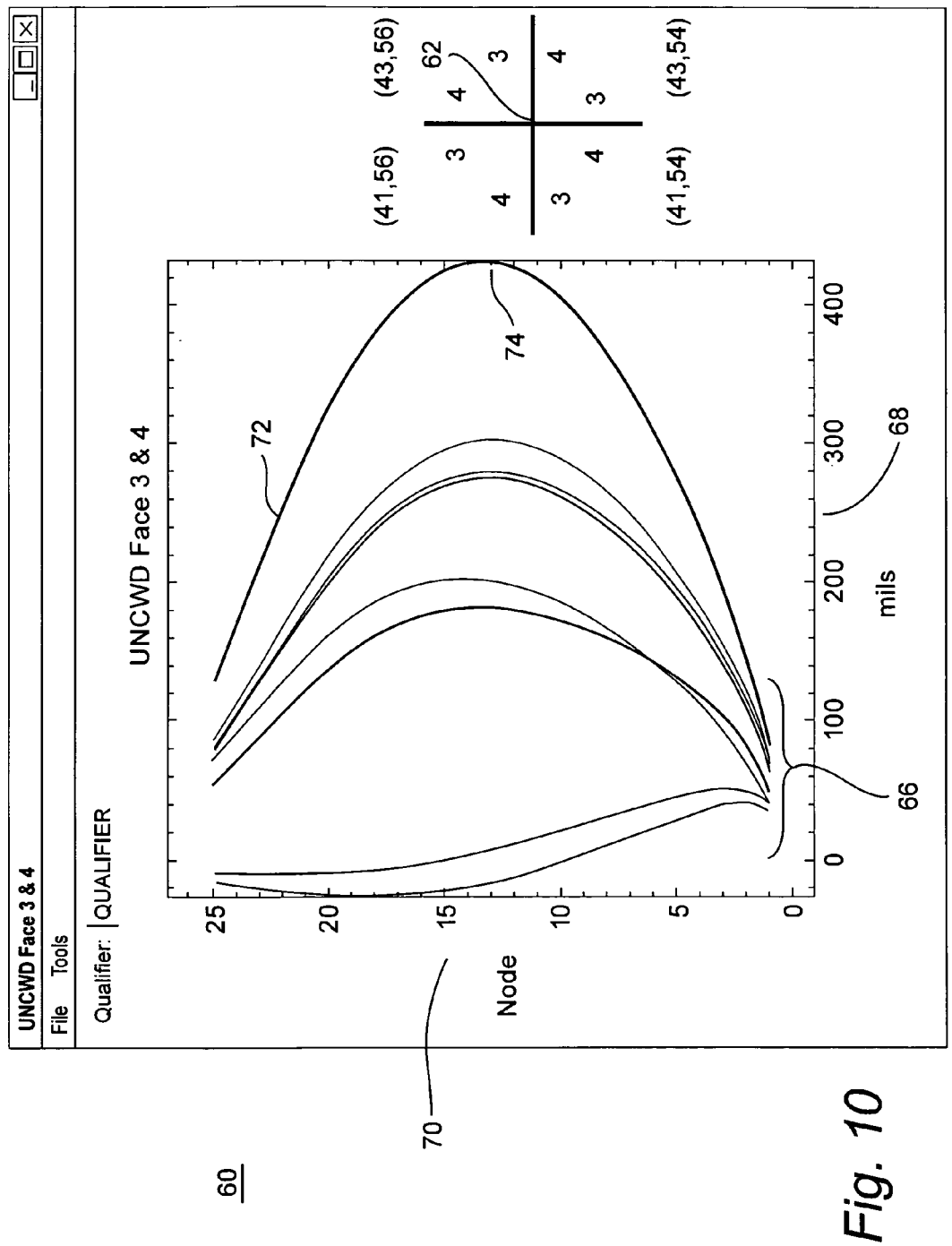
FIG. 10 is a computer display screen image showing a control cell icon (right hand side of screen image) and line graphs of potential channel deformations in the control cell (center graph).

FIG. 9 is an enlarged viewer image of a single control cell 44, including a blade 46 with wings and several adjacent channels 48. The colored or gray-scale square 50 identifying the blade 46 presents a cell friction metric (CFM) number (shown as "587") for the control cell shown in FIG. 9. The CFM is provided by the dataset selected to be presented on the viewer. The square box 50 for the control cell may also present data regarding the axial elevation node CFM, e.g., "13" and, alternatively, a control blade notch number for the cell.

The square box 50 of each control cell 44 may be colored or shaded to indicate the severity of channel blade interference due to channel deformation within the cell. For example, the color of the channel may change to indicate various channel-control blade interference levels such as: low risk that interference will result in a blade no settle condition in the cell; a slight risk that blade no settle condition will arise in the cell during normal operation; significant risk of a blade no settle condition where mitigation actions are recommended, and high risk of blade no settle condition sufficient to prohibit operation of the cell.

The area of the cell 44 corresponding to each fuel assembly in the viewer includes arrows and numbers identifying the channel surfaces that face a wing of the control blade. Data regarding deformation of the channel surfaces that are not adjacent a wing of a control blade are not shown in the viewer. Deformations of channel surfaces that are not adjacent a control blade are not likely to hinder the movement of control blades. Accordingly, this data is not shown so as to reduce the complexity of the viewer display. The arrows 52 shown in FIGS. 8 and 9 indicate the direction of deformation of the channel surfaces adjacent blade wings. An arrow pointing towards the wing indicates that deformation is towards the wing. An arrow for a channel surface that points away from the wing indicates that the deformation of that surface is away from the wing. In addition to the arrow, the viewer displays numbers, such as 433, 201, 275, 303, 101, 279, 6, −18 all of which are shown in FIG. 9. These numbers are obtained from the "dataset" selected 42 (FIG. 8) from the pull-down menu. These numbers represent the degree of deformation of the channel wall corresponding to the number.

In a visualization sense, various color schemes applied to the boxes 50 or each cell provide feedback to the user. The user in this case is, for example, a core designer or a reactor operator. The color schemes indicate if a problem exists, in either the present or the future, and its level of severity. An action involving a simulation may then be taken, such as modifying the design in terms of shuffling the bundle (for a designer) or moving a control blade or flow (for an operator), with the results of the simulation being redisplayed to the user in the visual environment.

Figure 11:
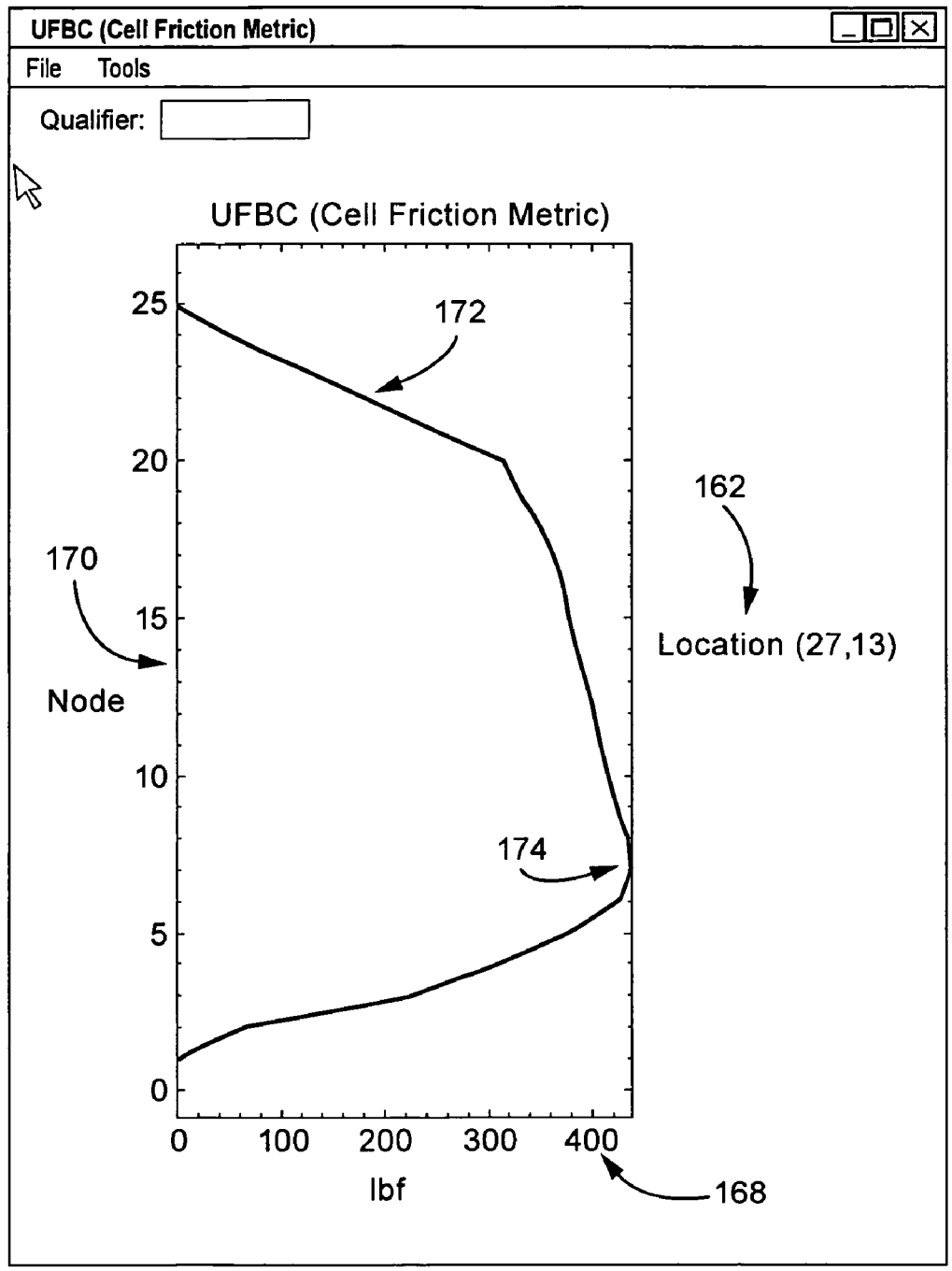
FIG. 11 shows the line graph of a cell friction metric (CFM) in the control cell with the location of control cell identified on the right.

FIG. 11 is a viewer screen image of a chart 70 illustrating the channel deformation adjacent a specific control blade 62. Each channel face adjacent a wing of the blade is represented by a colored line 64 in a chart 66 of deformation deflection 68 versus axial position 70 of the channel face in the cell. In the example shown in the figure, one of the channel faces 72 is extremely deformed at a mid-point 74 of the length of the cell. The chart 70 allows users to view the deformation at a particular cell and control blade.

Figure 12:
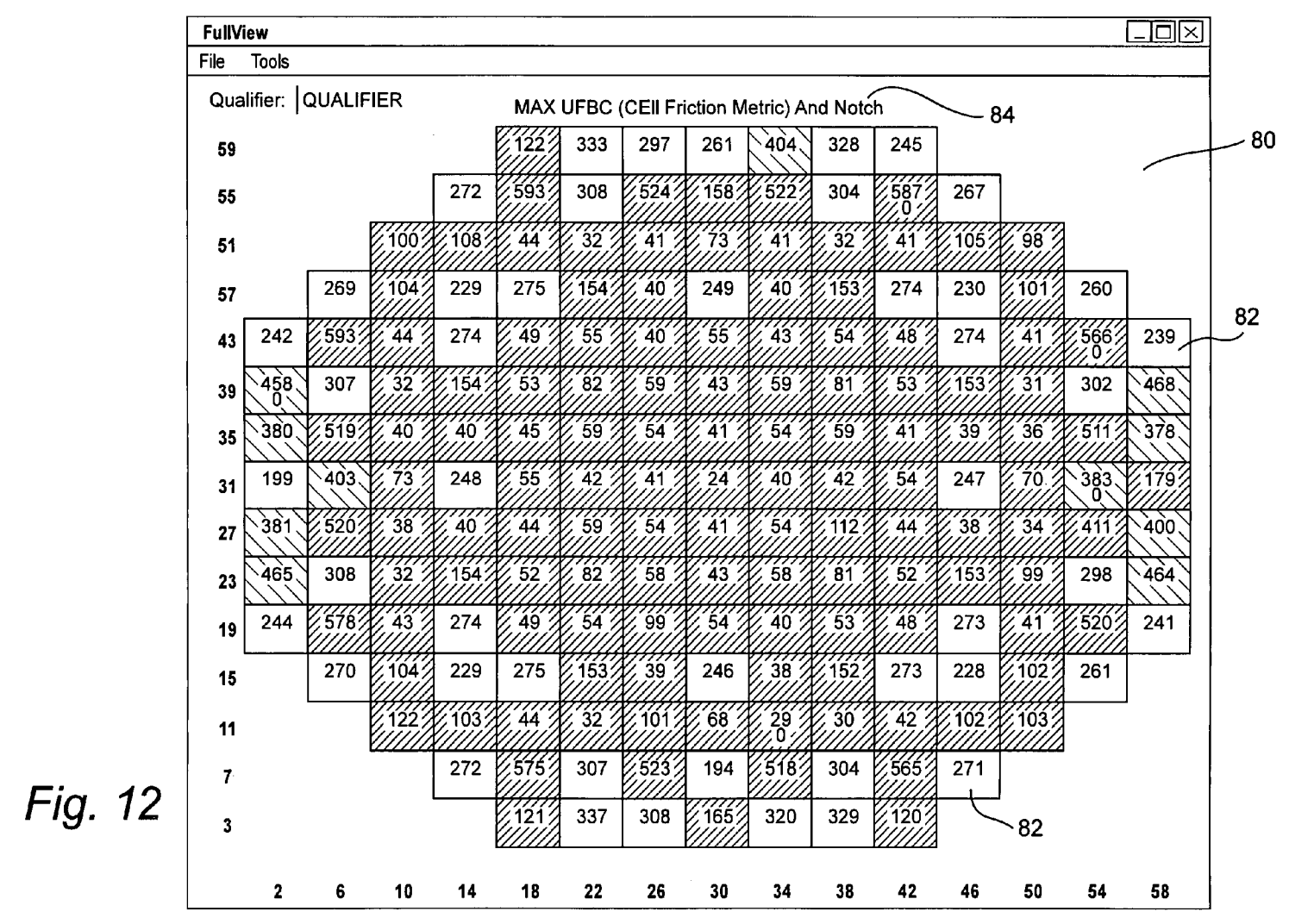

FIG. 12 similarly is a viewer screen image of a chart 170 illustrating the axial shape 172 of the cell friction metric specific to control blade identified at location 162. The cell friction metric 168 versus axial position 170 in the cell is plotted for the control blade. In the example shown in the figure, the maximum cell friction metric is at axial elevation indicated by 174. The chart 170 allows users to view the axial shape of cell friction metric at a particular cell and control blade.

FIG. 13 is a view screen image 80 of a full BWR core wherein selected control cells 82 are highlighted. The selected control cells are determined by the dataset selected for the image. In the image shown in FIG. 11, the selected dataset is of the maximum cell friction metric 84. In particular, the highlighted control cells are those having a cell friction metric above a threshold specified for a maximum level. The maximum cell friction metric is an indicator of a cell in which the channel deformation is at or nearly at a level that is at substantial risk of interfering with control blade movement. These highlighted control cells are those at risk of interfering with the control blade. By highlighting the control cells at or above the maximum cell friction metric threshold level, the screen image shown in FIG. 11 graphically shows those cells most at risk of control blade interference.

The core image 80 highlights certain control cells that exceed a certain threshold related to channel deformation and/or control blade interference. This core image 80 provides a cell table FIG. 13 that can be used to monitor cells. For example, when control cells are rearranged in the core, the cell table FIG. 13 provided by core image 80 can be used to identify control cells at risk of control blade interference. The at-risk control cells may then be rearranged in the core such that the risk of blade interference is minimized.

FIG. 13 shows cell friction metric (CFM) data at two qualifiers. The qualifiers are representative of the state of core as it burns to produce power. Under each of the qualifiers there are three columns of data. Each column is representative of the level of severity of a problem cell. The CFM Level III is more severe than Level I. In each of the 3 columns there are three sub-columns. The first two sub-columns identify the control cell location—the first is in core simulator coordinates and the second is in core site coordinates. The third sub-column is the CFM ratio to the threshold value for the corresponding level. The data is arranged in decreasing order of the CFM ratio, which helps the user additionally prioritize addressing the problem cells within each level of severity.

The channel distortion visualization viewer assists a BWR operator or designer to image potential channels that may deform and hinder the movement of control blades. The channel distortion visualization tool aids in identifying, analyzing and solving channel distortion and cell friction issues during various stages of operating nuclear reactor cycle design, optimization, licensing, and monitoring. The tool may be embodied in a software program having a graphical user interface (GUI) that generates and display images of the BWR core and individual control cells within the core, wherein the images highlight channel distortions and potentially affected channel blades. The software program may reside in memory of a control computer 106 used to control the BWR.

The channel distortion visualization tool may be embodied as a display, visualization, and processing software viewer tool. Using the tool, a user may easily identify channel distortions and those that are likely to affect control blades, and decide whether to take mitigating actions, such as scheduling the affected control cell for repair and adjusting the control algorithm. The tool can display a substantial amount of information regarding channel distortions and present the information in a convenient graphical user interface to easily identify the problem.

The viewer tool may be a software program operating on the computer system (see 106 in FIG. 12) including a display device, e.g., a computer terminal screen, for presenting a graphical image of the core and a processor generating the graphical image using the at least one data set; the graphical image of the core includes symbolic representations of control blades arranged in the core, indicia identify each control blade, and indicia regarding deformation of channels adjacent each control blade, and a viewer software tool executed by the processor which accesses the at least one data set and determines a location in the core of the control blades and channels, and correlates the deformation data with the channels for display on the graphical image.

A feature that may be included in the view tool is that the tool may organize the channel deformations by segregating them in a general and flexible manner into various components based on different interactions, which assists the user to uniquely identify and take mitigating action for a specific cell friction condition in the core. The tool is applicable to any set of methods used for design, optimization, licensing, and monitoring of nuclear fuel rod reactors. In a preferred embodiment, the viewer tool is implemented as a computer software module of a larger computer program for designing, optimizing, licensing and/or monitoring functions.

Another novel aspect of the viewer tool is the cell-monitoring table generated at selected intervals as the simulation runs (and the core burns in a cycle). It neatly displays a list of cells susceptible to cell friction at various levels of severity. The color-coding and text provides the user with an interactive feedback mechanism to assess the impact of any changes. The viewer shows where the channel deformation problems are and provide a visual guide as to what to do to relieve channel deformation problems. The color-coding scheme provides a rank of the channel deformation in each cell with regard to its contribution to the total cell friction and allows a swap with bundles in other cells of different color rank. During plant operation, schemes such as color-coding and the cell friction table show the operator that certain blades are to be avoided during the cycle because of their future effect, or might indicate to the operator a certain path to follow to achieve a certain future effect.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An apparatus generating a graphical image of a core of a boiling water reactor (BWR) using at least one data set of channel deformation data, said apparatus comprising:
   a computer system including a display device for presenting the graphical image, a non-transitory storage device storing the at least one data set, and a processor generating the graphical image using the at least one data set;
   said graphical image of the core includes symbolic representations of control blades arranged in the core, indicia identifying each control blade, and indicia regarding deformation of channels adjacent each control blade, and
   a viewer software tool stored on the storage device and executed by the processor which accesses the at least one data set and determines a location in the core of the control blades and channels, and correlates and presents the channel deformation data with the channels for display on the graphical image,
   wherein the viewer software tool identifies surfaces of each channel adjacent to one of the control blades, and includes data regarding an amount of deformation of the identified surfaces towards or away from an adjacent blade of the control blades, and
   wherein the indicia regarding deformation of each channel surface indicates a degree of deformation of the surface adjacent the corresponding control blade and whether the deformation of the surface is towards or away from the corresponding control blade.

2. The apparatus of claim 1 wherein the indicia regarding deformation of each channel surface is limited to indicia of channel surfaces adjacent a wing included in the symbolic representation of one of the control blades.

3. The apparatus of claim 1 wherein the indicia regarding deformation of each channel surface includes an arrow to indicate whether the deformation of the surface is towards or away from the corresponding control blade.

4. The apparatus of claim 1 wherein the indicia regarding deformation of each channel surface includes an alphanumerical value to indicate the degree of deformation of the surface adjacent the corresponding control blade.

5. The apparatus of claim 1 further comprising a graphical channel deformation chart of channel deformation adjacent one control blade, wherein the chart is generated by the processor from the at least one data set of channel deformation data.

6. The apparatus of claim 5 wherein the channel deformation chart includes a graphical presentation of deformation at least one channel surface along a length of the control blade.

7. The apparatus of claim 1 further comprising a graphical cell friction metric chart for the control blade in a control cell, wherein the processor generates the chart from the cell friction metric data.

8. The apparatus of claim 7 wherein the cell friction metric chart includes a graphical presentation of cell friction metric along a length of the control blade.

9. The apparatus of claim 1 wherein the indicia identifying each control blade is highlighted to indicate a degree of severity of channel deformation adjacent the control blade, and said viewer software tool generating the indication of degree for said control blade.

10. The apparatus of claim 9 wherein the highlight is a color applied to the control blade indicia and the color is selected by the viewer software tool based on the at least one data set.

11. An apparatus generating a graphical image of a core of a boiling water reactor (BWR) using at least one data set of channel deformation data, said apparatus comprising:
   a computer system including a display device for presenting the graphical image, a processor generating the graphical image using the at least one data set and a non-transitory computer memory device storing a viewer software tool program executable by the processor and the at least one data set of channel deformation data;
   said graphical image of the core includes symbolic representations of control cells arranged in the core wherein the representations are arranged in the core image corresponding to the locations of control cells in the core of the BWR, wherein each symbolic representation of the control cell includes a symbolic representation of a control blade and of channels of fuel bundle assemblies adjacent the control blade, and the viewer software tool, when executed by the processor, causes the computer system to access the at least one data set and determines a location in the core for each of the symbolic representations of control cells and determines which control cell representations to include with indicia of channel deformation in the graphical image based on channel deformation data for each cell, wherein the viewer software tool identifies surfaces of each channel adjacent to the control blade, and includes data regarding an amount of deformation of the identified surfaces towards or away from the control blade, and wherein the indicia regarding deformation of each channel surface indicates a degree of deformation of the surface adjacent the corresponding control blade and whether the deformation of the surface is towards or away from the corresponding control blade.

12. The apparatus of claim 11 wherein the determination of which control cell representations to include is based on whether a deformation metric for a control cell exceeds a predetermined threshold level for the metric.

13. The apparatus of claim 12 wherein the threshold level is a selectable level.

14. The apparatus of claim 11 wherein the viewer software tool includes a selection of a plurality of data sets and a selected data set is used by the viewer software tool to determine which control cell representations to include in the image.

15. A method for generating a graphical image of a core of a boiling water reactor (BWR) using at least one data set of channel deformation data stored on a non-transitory electronic data storage device and a processor to access the data and generate the graphical image, said method comprising:

accessing at least one data set of a plurality of data sets, wherein the accessed data set includes data regarding channel deformation in a plurality of channels in the core and regarding a location of the channel with respect to control blades in the core;

processing the accessed data to identify the surfaces of the channels that are adjacent to one of the control blades and to collect data regarding channel deformation for the identified channel surfaces, and generating the graphical image of the core, said graphical includes symbolic representations of control blades arranged in the core, indicia identify each control blade, and indicia regarding deformation of channels adjacent each control blade, wherein the graphical image of the core illustrates surfaces of each channel adjacent to surfaces of the control blades, and includes data regarding an amount of deformation of the identified surfaces towards or away from an adjacent control blade of the control blades, and wherein the indincia regarding deformation of each channel surface indicates a degree of deformation of the surface adjacent the corresponding control blade and whether the deformation of the surface is towards or away from the corresponding control blade.

16. The method of claim 15 wherein the processing and generating steps are performed by a viewer software tool executed by the processor which accesses the at least one data set and determines a location in the core of the control blades and channels, and correlates the deformation data with the channels for display on the graphical image.

17. The method of claim 15 wherein the indicia regarding deformation of each channel surface is presented adjacent a corresponding wing of the control blade.

18. The method of claim 15 wherein the indicia regarding deformation of each channel surface is limited to indicia of channel surfaces adjacent a wing included in the symbolic representation of one of the control blades.

19. The method of claim 15 wherein the indicia regarding deformation of each channel surface includes an arrow to indicate whether the deformation of the surface is towards or away from the corresponding control blade.

20. The method of claim 15 wherein the indicia regarding deformation of each channel surface includes an alphanumerical value to indicate the degree of deformation of the surface adjacent the corresponding control blade.

* * * * *

UNITED STATES PATENT AND TRADEMARK OFFICE
CERTIFICATE OF CORRECTION

| | | |
|---|---|---|
| PATENT NO. | : 8,185,836 B2 | Page 1 of 1 |
| APPLICATION NO. | : 11/354976 | |
| DATED | : May 22, 2012 | |
| INVENTOR(S) | : Atul Karve et al. | |

It is certified that error appears in the above-identified patent and that said Letters Patent is hereby corrected as shown below:

At column 2, line 17, delete "BWRS" and insert --BWRs--

In the Claims:

In Claim 15, at column 12, line 15, delete "the indincia" and insert --the indicia--

Signed and Sealed this
Twenty-eighth Day of August, 2012

David J. Kappos
*Director of the United States Patent and Trademark Office*